(12) United States Patent
Khaligh et al.

(10) Patent No.: US 10,152,875 B2
(45) Date of Patent: Dec. 11, 2018

(54) SYSTEMS AND METHODS TO DETECT UNEXPECTED ELECTRIC BICYCLE EVENTS

(71) Applicant: GM GLOBAL TECHNOLOGY OPERATIONS LLC, Detroit, MI (US)

(72) Inventors: Sepehr Pourrezaei Khaligh, North York (CA); Norman J. Weigert, Whitby (CA); Scott Calnek, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 111 days.

(21) Appl. No.: 15/402,654

(22) Filed: Jan. 10, 2017

(65) Prior Publication Data

US 2018/0197401 A1    Jul. 12, 2018

(51) Int. Cl.
*A42B 3/04* (2006.01)
*G08B 25/10* (2006.01)
*B62M 6/50* (2010.01)
*B62J 99/00* (2009.01)

(52) U.S. Cl.
CPC .............. *G08B 25/10* (2013.01); *B62M 6/50* (2013.01); *B62J 2099/002* (2013.01); *B62J 2099/0013* (2013.01)

(58) Field of Classification Search
None
See application file for complete search history.

(56) References Cited

U.S. PATENT DOCUMENTS

2005/0275522 A1* 12/2005 Nitz .................. B60Q 1/52
                                                    340/471
2011/0133918 A1*  6/2011 Lee .................. B62J 99/00
                                                    340/436
2015/0305426 A1* 10/2015 Lee .................. A42B 3/046
                                                    340/539.12
2016/0007384 A1*  1/2016 Dettloff ............. H04W 76/007
                                                    455/404.1
2017/0108342 A1*  4/2017 Foreman ........... G01C 21/3415
2017/0208180 A1*  7/2017 Kowalewski ......... H04M 11/04

OTHER PUBLICATIONS

Candefjord, S. et al. "Using Smartphones to Monitor Cycling and Automatically Detect Accidents—Towards eCall Functionality for Cyclists," Proceedings of the International Cycling Safety Conference, Goteborg, Sweden, Nov. 18-19, 2014.
Livall Smart Bike Helmet, which uses only the helmet accelerometer data to detect accidents and is Non-Model-Based: http://www.digitaltrends.com/health-fitness/livall-smart-cycling-system/.

* cited by examiner

*Primary Examiner* — Brent Swarthout
(74) *Attorney, Agent, or Firm* — Lorenz & Kopf, LLP

(57) ABSTRACT

An unexpected event detection system is provided for a rider operating an electric bicycle. The system includes a bicycle data unit configured to receive bicycle data from the electric bicycle; a wireless device data unit configured to receive device data from a wireless device; an unexpected event module coupled to receive the bicycle data from the bicycle data unit and to receive the device data from the wireless device, the unexpected event module configured to identify an unexpected event associated with the electric bicycle based on the bicycle data and the device data and to generate an alert message upon identification of the unexpected event; and an alert module coupled to the unexpected event module and configured to initiate sending the alert message to an assistance center.

17 Claims, 3 Drawing Sheets

SYSTEMS AND METHODS TO DETECT UNEXPECTED ELECTRIC BICYCLE EVENTS

TECHNICAL FIELD

The present invention generally relates to electric bicycles, and more particularly relates to systems and methods for detecting unexpected electric bicycle events.

BACKGROUND OF THE INVENTION

Electric bicycles are increasing in popularity. Such bicycles typically include conventional bicycle components integrated with an electric motor that may be used for propulsion, including assisting or supplementing the pedal power supplied by the rider.

At times, electric bicycles may be involved in unexpected events that warrant outside attention or assistance. In motor vehicles, algorithms and associated sensors have been used to identify such events based on various vehicle parameters, such as air bag deployments, and to request assistance. However, attempts at automatically identifying unexpected events associated with electric bicycles have proved challenging.

Accordingly, it is desirable to provide improved systems and methods for automatically detecting unexpected electric bicycle events. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an exemplary embodiment, an unexpected event detection system is provided for a rider operating an electric bicycle. The system includes a bicycle data unit configured to receive bicycle data from the electric bicycle; a wireless device data unit configured to receive device data from a wireless device; an unexpected event module coupled to receive the bicycle data from the bicycle data unit and to receive the device data from the wireless device, the unexpected event module configured to identify an unexpected event associated with the electric bicycle based on the bicycle data and the device data and to generate an alert message upon identification of the unexpected event; and an alert module coupled to the unexpected event module and configured to initiate sending the alert message to an assistance center.

In accordance with another exemplary embodiment, a wireless device is provided for detecting an unexpected event for a rider on an electric bicycle. The wireless device includes a bicycle interface configured to receive bicycle data from the electric bicycle; an acceleration sensor configured to determine an acceleration of the wireless device; and a controller coupled to the bicycle interface and the acceleration sensor. The controller includes a processor and memory storing computer readable instructions capable of, upon execution by the processor, forming an unexpected event detection system with a bicycle data unit configured to receive the bicycle data from the electric bicycle via the bicycle interface; a wireless device data unit configured to receive the acceleration from the acceleration sensor as device data; an unexpected event module coupled to receive the bicycle data and the device data, the unexpected event module configured to identify the unexpected event associated with the electric bicycle based on the bicycle data and the device data and to generate an alert message upon identification of the unexpected event; and an alert module coupled to the unexpected event module and configured to initiate sending the alert message to an assistance center. The wireless device further includes a network interface coupled to the controller and configured to send the alert message to the assistance center via a cellular network.

In accordance with a further exemplary embodiment, a computer implemented method is provided for detecting an unexpected event for a rider on an electric bicycle. The method includes receiving bicycle data from the electric bicycle; receiving wireless device data from a wireless device; identifying the unexpected event associated with the electric bicycle based on the bicycle data and the device data; and sending an alert message upon identification of the unexpected event to an assistance center.

BRIEF DESCRIPTION OF THE DRAWINGS

The present invention will hereinafter be described in conjunction with the following drawing figures, wherein like numerals denote like elements.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
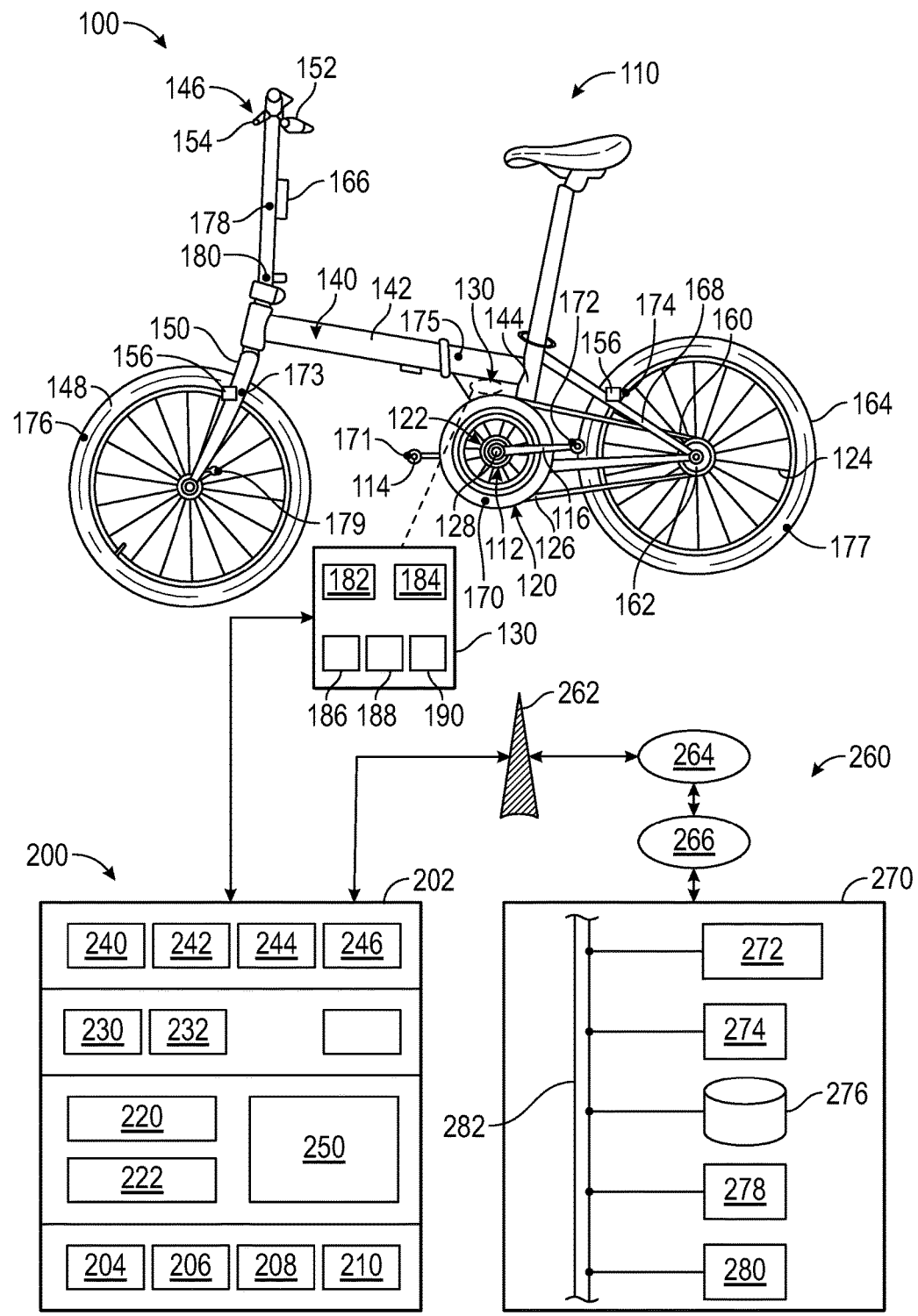
FIG. 1 is a block diagram of an environment for implementing an unexpected event detection system in accordance with an exemplary embodiment.

FIG. 1 is a block diagram of an environment 100 for implementing a detection system for unexpected events in accordance with an exemplary embodiment. Generally, the term "unexpected event" refers to an unintended, unplanned, or otherwise unexpected event associated with the electric bicycle, such as an unexpected contact incident with an object (e.g., contact another bicycle, person, vehicle, barrier, etc.), an unexpected contact incident with the ground (e.g., the bicycle falling over with the rider), and/or any event in which the operation and trajectory of the bicycle does not match the intended operation and trajectory of the bicycle. As described below, these unexpected events may be defined or modeled based thresholds, limits, and algorithms associated with various types of parameters to indicate when such events occur and/or when assistance for the rider may be required.

In general, exemplary embodiments discussed below are described within the context of an electric bicycle 110, a wireless device 200, and an assistance network 260. Each aspect will be introduced below prior to a more detailed description of unexpected event detection systems and methods. It should be appreciated that the overall architecture, setup and operation, as well as the individual components of the illustrated environment 100, are merely exemplary and that differently configured arrangements may also be utilized to implement the examples disclosed herein. Thus, the following paragraphs, which provide a brief overview of the illustrated environment 100, are not intended to be limiting.

Generally, the electric bicycle 110 may take various forms and may be alternately referred to as an electric cycle, e-bike, booster bike, motorized bike, pedelec, and the like. Although depicted in FIG. 1 as being two-wheeled, exemplary embodiments discussed herein are applicable to any type of electric cycle, including tricycles and four-wheel electric cycles. In the depicted example, the electric bicycle 110 includes a frame 140 that supports a rider (not shown), a drivetrain 112, and various control and operational components. Generally, the electric bicycle 110 may have a pedal force-based propulsion system, which allows the rider to provide intuitive input commands using foot pedal assemblies 114, 116 similar to riding a non-motorized bicycle.

In one embodiment, the frame 140 may include a top tube 142 connected to a seat tube 144. A front wheel 148 is attached to the frame 140 via a fork 150, and a rear wheel 164 is attached to the frame 140 via frame stays 168. Handlebars 146 may be attached to the top tube 142 and operatively connected to the wheel fork 150 to enable rider steering of the front wheel 148. In some embodiments, a device mount 166 may be provided on the handlebars 146 and/or top tube 142 to receive and/or secure a wireless device (e.g., wireless device 200) to the electric bicycle 110.

The electric bicycle 110 further includes a drivetrain 112 constructed and arranged to allow a rider to provide input thereto using the first and second pedal assemblies 114, 116. The pedal assemblies 114, 116 may include foot pedals configured to engage with the respective foot of the rider to accept pedal force. The pedal assemblies 114, 116 function to drive a crank 128, chain ring or sprockets 126, chain 160, and rear sprocket 162, which in turn, drives the rear wheel 164.

The electric bicycle 110 may include a gearing assembly or other mechanical mechanisms 122 that may be selectively constructed and arranged to provide for at least one of gearing ratios, locking arrangements, and/or free rotation arrangements between the drivetrain 112, pedal assemblies 114, 116, wheels 148, 164, and/or motor 120, described below.

In one embodiment, the electric bicycle 110 may include an electric motor (or motor/generator) 120 that may be used to propel the electric bicycle 110 forward and/or to generate electricity from motor braking. In any of a number of variations, the electric motor 120 may be powered by one or more battery assemblies 124. The motor 120 may be attached to the electric bicycle 110 adjacent the pedal assemblies 114,116, chain ring 126 (or belt ring) and/or crank 128. Although exemplary placements of the various components are shown in FIG. 1, variations may be provided. Although not shown in detail, the motor 120 may include or otherwise be integrated with additional powertrain components including, but not limited to, internal hub gears, override gears, a cycle roller-based continuously variable transmission (CVT) and/or control electronics. The motor 120 may include any of a number of types of motor/generators including, but not limited to, a permanent magnet AC machine, either surface mount or interior permanent magnet rotor.

Control levers 152 may be provided on the handlebars 146 and may be constructed and arranged to communicate with electronic controls 130, the gearing assembly 122, and/or the motor 120 in order to accept inputs to operate the electric bicycle 110. A brake lever 154 may also be provided on the handlebars 146 to actuate a braking system 156. Braking system 156 functions to stop or slow the motion of the electric bicycle 110. In one example, the braking system 156 is positioned on one or both wheels 148, 164. However, in other embodiments, the braking system 156 is configured to slow or stop the motion of the electric bicycle 110 at the motor 120 and/or other portions of the drivetrain 112.

Generally, electronic controls 130 may be provided to control and/or facilitate operation of the electric bicycle 110, including operation of the motor 120, gearing assembly 122, and/or braking system 156. The electronic controls 130 may include electronic processing components to receive input signals and to send out signals to control various aspects of the bicycle 110. In a number of variations, the electronic controls 130 may include a processing unit 182 and memory 184, including software and/or hardware to process input signals and generate output signals, and may include formulas, lookup table or other means for comparing and processing data to control the operation of the electric bicycle 110. The processing unit 182 may be implemented using a digital signal processor, microprocessor, microcontroller, programmable logic unit, discrete circuits, or a combination thereof. The memory 184 may include random access memory, read only memory, optical memory, or any other type of memory. Additional details are provided below.

As examples, the electric bicycle 110, including the electronic controls 130, may be selectively constructed and arranged to provide for at least one of the following functions: (A) an assist function in which the torque is detected and assistance in rotating the crank 128 is provided by the electric motor 120; (B) a coast with spinning motor function; (C) an coast function with regenerative braking; (D) a pedal force throttle function; (E) a coast with rear hub function; and/or (F) other suitable functions.

The electric bicycle 110 may further any number of sensors or sensor assemblies. In one embodiment, a motor torque sensor 170 is provided to determine the amount of torque being output by the motor 120. Pedal torque sensors 171, 172 may be provided for each pedal assembly 114, 116 in order to determine the amount of torque that the rider is applying to the electric bicycle 110 via the pedal assemblies 114, 116. In further embodiments, brake torque sensors 173, 174 are provided to determine the amount of braking torque being applied to the wheels 148, 164 and/or other component of the drivetrain 112. The electric bicycle 110 further includes one or more acceleration sensors 175 in order to determine the overall acceleration. Such acceleration may be provided in one or more dimensions, including all three spatial dimensions. In further embodiments, tire pressure sensors 176, 177 are provided to measure the air pressure in the tires of the wheels 148, 164. Such sensors 176, 177 may provide indications regarding the status of the tires (e.g., flat, or underinflated), as well as indications regarding the presence of a rider on the electric bicycle 110. Further, a mount sensor 178 may be provided to determine when a wireless device is positioned within the device mount 166. In some embodiments, a wheel speed sensor 179 may be provided in order to calculate the speed of the electric bicycle 110 based on the wheel rotations. In further embodiments, a steering angle sensor 180 may be provided in order to determine the steering angle of the handlebars 146, and thus, the front wheel 148. Data from one or more of the sensors 170-180 is provided to the electronic controls 130. In some embodiments, one or more sensors 170-180 may be omitted, and if necessary, associated data may be derived or estimated in another manner.

In additional to general operation of the electric bicycle 110, the electronic controls 130 may facilitate and/or implement unexpected event detection functions, as described in greater detail below. As introduced above, the electronic controls 130 includes the processing unit 182 and memory 184, and may further include a control module 186, data module 188, and communications module 190. In one embodiment, the modules 186, 188, 190 may be considered hardware and/or software (e.g., stored in memory 184) to perform one or more functions. In this example, the control module 186 functions to receive input and generate appropriate commands to generally control operation of the bicycle 110. The data module 188 functions to collect data from the sensors 170-180 and/or other components of the bicycle 110. Such data may include motor torque, pedal torque, brake torque, acceleration, tire pressure or tire status, mount status, wheel speed, and steering angle. The communications module 190 may be configured to wirelessly transmit messages from and/or from the electric bicycle 110. For example, the communications module 190 may transmit such information in a broadcast manner such that all receiving devices within the transmission range can potentially receive the information. In one exemplary embodiment, the communications module 190 may be a relatively short range transmitter that is configured for compatibility with an appropriate short range wireless data communication scheme, such as IEEE Specification 802.11 (Wi-Fi), WiMAX, the BLUETOOTH™ wireless communication protocol, the BLUETOOTH™ low energy (BLE) wireless communication protocol, a Dedicated Short Range Communication (DSRC) system, or the like. In other embodiments, a cellular or satellite communication system may be utilized to wirelessly convey the data. Accordingly, the messages from the electric bicycle 110 may be formatted, arranged, and/or packaged as needed for transmission in a manner that is compatible with the particular wireless data communication technique and protocol. In some embodiments, the communications module 190 may include a receiver for receiving corresponding messages. As described in greater detail below, the communications module 190 particularly sends and/or exchanges messages with the wireless device 200.

As noted above, the electric bicycle 110 interacts with a wireless device 200. In one exemplary embodiment, the wireless device 200 implements an unexpected event detection system 250 as a computer implemented system and/or method, although in other embodiments, one or more aspects of the unexpected event detection system 250 may be implemented as a stand-alone device or as part of the electric bicycle 110. Additional details regarding operation of the unexpected event detection system 250 will be provided below.

Generally, the wireless device 200 may be a smartphone, tablet, personal digital assistant, cell phone, a wearable device (e.g., a smart watch, glasses, headset, etc.), or the like that performs various types of functions typical in such devices in addition to the unexpected event detection functions discussed below, although in some embodiments, the wireless device 200 may be a dedicated unexpected event detection device and/or otherwise associated with the electric bicycle 110. In one implementation, the wireless device 200 includes various hardware and software components housed within a housing 202. In one embodiment, the wireless device 200 includes a controller (or processing unit) 220 and memory 222. In general, the controller 220 controls the operation of the wireless device 200 in accordance with computer instructions stored in memory 222. The controller 220 may be implemented using a digital signal processor, microprocessor, microcontroller, programmable logic unit, discrete circuits, or a combination thereof that executes instructions for software, firmware, programs, algorithms, scripts, and/or applications that are stored in one or more memory devices and may govern the processes and methods described herein. The memory 222 may include random access memory, read only memory, optical memory, or any other type of memory. The memory 222 may be arranged and configured to store information to be used by various components of the wireless device 200, including those discussed below. Generally, the wireless device 200 may be a communications device that supports various communication functions, including telephone, email, and web-browsing.

As is typical, the wireless device 200 includes various types of hardware and/or software components, including a display unit 204, user interface 206, microphone 208, and speaker 210, to facilitate operation of the device 200. As an example, the display unit 204 may include an liquid crystal display (LCD) or other suitable device to display information, while the user interface 206 may include a keyboard, keys, touchscreen input, or combination of input mechanisms for receiving and making telephone calls and supporting other interactions between the rider and wireless device 200. In some embodiments, the display unit 204 and user interface 206 may be combined, for example, in a touch screen display configured to receive user actuation. The microphone 208 provides the rider or other user with a mechanism for inputting verbal or other auditory commands, and can be equipped with an embedded voice processing unit utilizing a human/machine interface (HMI) technology known in the art. The speaker 210 provides audible output to the rider. For example, user interface 206 may be used to initiate voice and/or data communication with assistance center 270 (whether it be a human or an automated call response system). As described below, such communications with the assistance center 270 may be automatically initiated via the unexpected event detection system 250.

The wireless device 200 further includes a number of interface components that enable the wireless device 200 to communicate with the electric bicycle 110, the assistance center 270, and/or other communications systems or networks. Generally, the interfaces 230, 232 may be considered part of a single communications interface and include any communications functionality typically implemented in a modern computing device.

In one exemplary embodiment, the interfaces 230, 232 may be considered to include a bicycle interface 230 that exchanges information and/or messages with the bicycle 110. For example, the bicycle interface 230 may include be a relatively short range transmitter and/or receiver that is configured for compatibility with an appropriate short range wireless data communication scheme, such as IEEE Specification 802.11 (Wi-Fi), WiMAX, the BLUETOOTH™ wireless communication protocol, the BLUETOOTH™ low energy (BLE) wireless communication protocol, a Dedicated Short Range Communication (DSRC) system, or the like, although a cellular or satellite communication system may also be utilized to wirelessly convey the data. As described in greater detail below, the bicycle interface 230 is configured to receive bicycle data from the corresponding communications module 190 of the electric bicycle 110 for use in the unexpected event detection system 250. In one particular embodiment, the bicycle interface 230 of the wireless device 200 and the communications module 190 of the electric bicycle 110 form a BLUETOOTH™ pairing to exchange information.

In one embodiment, the network interface 232 may include any hardware and software components suitable for establishing communications between the wireless device 200 and the assistance network 260. In one embodiment, the wireless device 200 and/or network interface 232 may be considered a telematics unit that provides various services, including emergency or roadside assistance-related services provided in connection with various unexpected event scenarios, as described below.

The network interface 232 may be configured to establish a channel or connection with assistance network 260 so that both voice and data transmissions may be sent and received. For example, the network interface 232 may include a cellular receiver for voice communications and a wireless modem for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc. The types of information exchanged with the network 260 may include voice communication, digital data, SMS messaging, MMS messaging, Internet access, multi-media content access, voice over internet protocol (VoIP), and other conventional communication standards and protocols. Although not shown, the wireless device 200 may further include a dual mode antenna to facilitate communication between the wireless device 200 and the assistance network 260 and electric bicycle 110, as well as service a GNSS sensor 240.

The wireless device 200 further includes a number of sensors 240, 242, 244, 246, one or more of which may be typical in wireless device 200 as a modern smartphone, for example. In particular, the GNSS sensor 240 may be considered to include any suitable hardware and software, such as a GPS chipset/component to receive GPS data, to receive location information from external satellite communication systems such that the location of the wireless device 200 may be determined. The wireless device 200 may further include an accelerometer 242 that measures acceleration of the wireless device 200 along one or more axes (e.g., 3-axis accelerometer). The wireless device 200 may further include a magnetometer 244 and/or gyroscope 246 that measure orientation of the wireless device 200 along one or more axes (e.g., 3-axis magnetometer and/or gyroscope). The data collected by the sensors 240, 242, 244, 246 may be provided to the unexpected event detection system 250 for detection and/or evaluation of an unexpected event, as will be discussed in greater detail after a description of the assistance network 260.

Generally, the assistance network 260 includes an assistance center (or call center) 270, as well as any network or combination of networks of devices that enable communications between the wireless device 200 and the assistance center 270. For example, assistance network 260 may include or otherwise utilize any one or any combination of a LAN (local area network), WAN (wide area network), telephone network, an intranet, an extranet, a virtual private network (VPN), wireless network, point-to-point network, star network, token ring network, hub network, or other appropriate configuration. One typical example is a TCP/IP (Transfer Control Protocol and Internet Protocol) network (e.g., the Internet, referring to a specific global internetwork of networks).

In one embodiment, the assistance network 260 may include or otherwise utilize a cellular telephone system or any other suitable wireless system that transmits signals between the wireless device 200 and the assistance center 270. According to an example, assistance network 260 includes one or more cell towers 262, as well as any other networking components required to connect the assistance network 260 with land network 266. As appreciated by those skilled in the art, various cell tower/base station/MSC arrangements are possible and could be used with assistance network 260.

The land network 266 can be a conventional land-based telecommunications network that is connected to one or more landline telephones, and that connects to assistance center 270. For example, land network 266 can include a public switched telephone network (PSTN) and/or an Internet protocol (IP) network, as is appreciated by those skilled in the art. Of course, one or more segments of the land network 266 can be implemented in the form of a standard wired network, a fiber or other optical network, a cable network, other wireless networks such as wireless local networks (WLANs), or any combination thereof.

The assistance center 270 is designed to provide a number of different system back-end functions and, according to the example shown here, generally includes one or more switches 272, servers 274, databases 276, and advisors 278, as well as a variety of other telecommunication/computer equipment 280. These various call center components are suitably coupled to one another via a network connection or bus 282. Switch 272, which can be a private branch exchange (PBX) switch, routes incoming signals so that voice transmissions are usually sent to either advisor 278 or an automated response system, and data transmissions are passed on to a modem or other piece of telecommunication/computer equipment 280 for demodulation and further signal processing. The modem or other telecommunication/computer equipment 280 may include an encoder, as previously explained, and can be connected to various devices such as a server 274 and database 276. For example, database 276 could be designed to store subscriber profile records, subscriber behavioral patterns, or any other pertinent subscriber information. Although the illustrated example has been described as it would be used in conjunction with an assistance center 270 that is manned, it will be appreciated that the assistance center 270 can be any central or remote facility, manned or unmanned, mobile or fixed, to or from which it is desirable to exchange voice and data.

Figure 2:
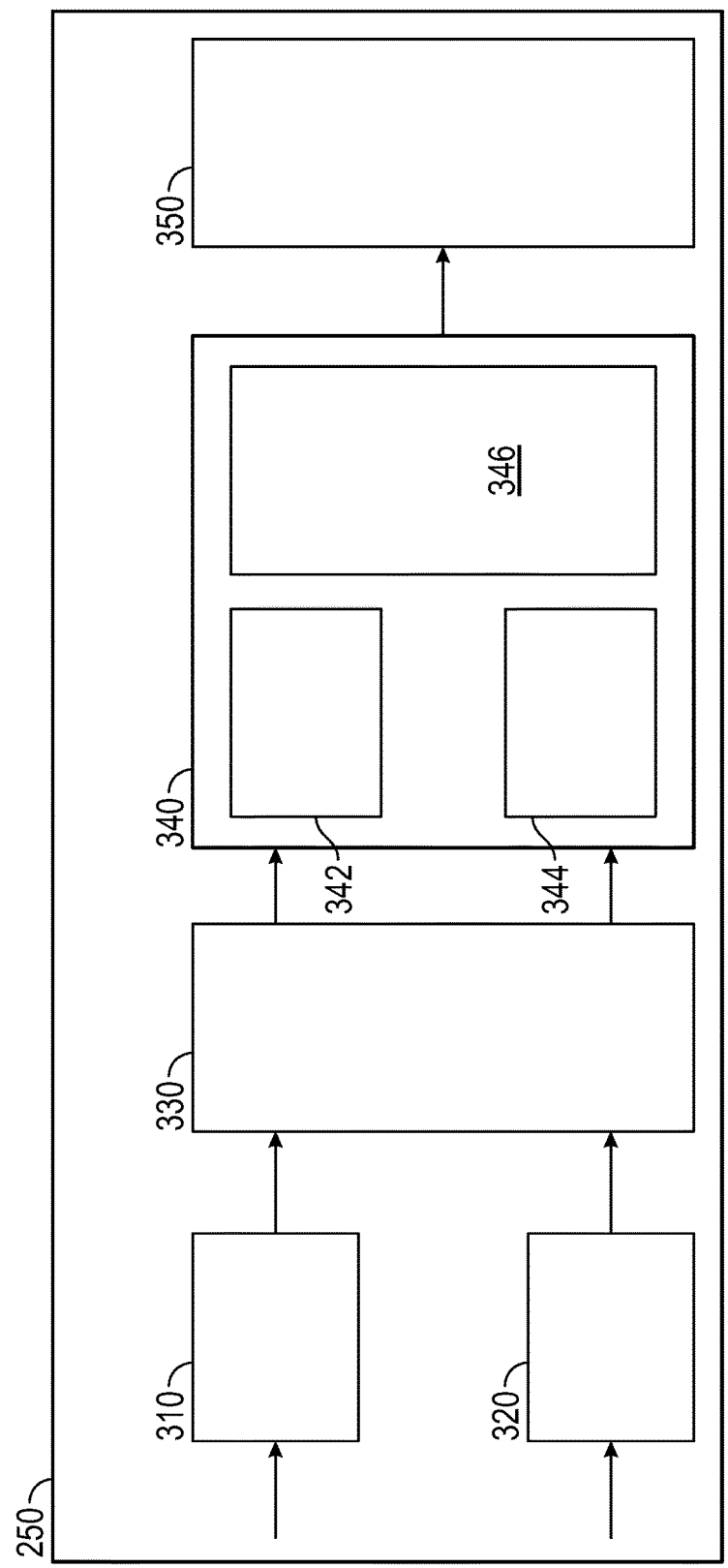
FIG. 2 is a block diagram of an unexpected event detection system implemented in the environment of FIG. 1 in accordance with an exemplary embodiment.

FIG. 2 is a more detailed view of the unexpected event detection system 250 of FIG. 1 in accordance with an exemplary embodiment. FIG. 1 is referenced in the discussion of FIG. 2 below. As noted above, the unexpected event detection system 250 may be implemented in the wireless device 200, e.g., by the controller 220 and memory 222 of the wireless device 200. In other embodiments, the unexpected event detection system 250 may have dedicated processing and memory resources, including within a stand-alone device or implemented in another device. The unexpected event detection system 250 is discussed below in the context of functional units or modules and may be implemented in any suitable manner. As shown, the unexpected event detection system 250 may be considered to include a bicycle data unit 310; a wireless device data unit 320; a state module 330; an unexpected event module 340; and an alert module 350 coupled together in any suitable manner, such as a data bus.

Generally, the bicycle data unit 310 collects various types of bicycle data from the electric bicycle 110, e.g. as transmitted by the communications module 190 of the electric bicycle 110 and received by the bicycle interface 230 of the wireless device 200. In one embodiment, the data includes motor torque, pedal torque, brake force, acceleration, wheel speed, steering angle, and tire pressure associated with the electric bicycle 110. Additional bicycle data may include the grade and/or orientation of the electric bicycle 110 and/or the status of the wireless device 200 relative to the device mount 166 of the electric bicycle 110. In some embodiments, the bicycle data may include the status of the rider relative to the bicycle 110 (e.g., whether or not the rider is riding the bicycle 110), the weight and inseam of the rider, and/or and data used to estimate the center of gravity of the bicycle 110 and rider. In some embodiments, one or more aspects of this data may be provided to the unexpected event detection system 250 via manual entry by the rider on the wireless device 200 or via a user interface of the electronic controls 130 of the electric bicycle 110. For example, the weight and inseam of the rider may be provided manually by the rider, although such parameters may also be measured.

Generally, the wireless device data unit 320 collects various types of device data from other components of the wireless device 200, particularly the sensors 240, 242, 244, 246. In one embodiment, the data includes acceleration data, GNSS data, magnetometer data, and/or gyroscope data.

The state module 330 may receive one or more types of data from the bicycle data unit 310 and/or the device data unit 320. Generally, the state module 330 functions to determine the state of the rider and/or bicycle 110 and/or initialize operation of the unexpected event detection system 250. For example, as initialization, the state module 330 may confirm that the wireless device 200 is mounted on the bicycle 110 in the device mount 166; confirm a connection between the electronic controls 130 of the bicycle 110 and the wireless device 200; confirm that tire pressure in the wheels 148, 164 is normal; confirm that the rider is on the bicycle 110; and/or confirm receipt of the weight and inseam of the rider. The state module 330 may also function to estimate the center of gravity of the rider and electric bicycle 110 and estimate the grade on which the bicycle 110 is operating.

Upon confirming that the state is suitable for unexpected event detection, the unexpected event module 340 receives data from the bicycle data unit 310, the wireless device data unit 320, and/or the state module 330. The unexpected event module 340 generally includes a predicted trajectory unit 342, a measured trajectory unit 344, and an event identification unit 346.

In one exemplary embodiment, the predicted trajectory unit 342 receives data associated with the electric bicycle 110, and in particular, receives the bicycle data from the bicycle data unit 310. The predicted trajectory unit 342 includes a mathematical model that generates one or more aspects of a predicted kinematic state of the bicycle 110. For example, based on inputs such as motor torque, pedal torque, brake force, acceleration, steering angle, and/or tire pressure, the dynamic model of the predicted trajectory unit 342 may generate predicted acceleration, rate of change of orientation, and rate of change in tire pressure, as well as derivations from this data, including predicted speed, position, and yaw. Accordingly, one or more of these measured or current parameters from the electric bicycle 110 may be used to determine a predicted trajectory of the electric bicycle 110 based on the data received from the bicycle 110. In one embodiment, the predicted trajectory may be represented by the following state vector ($x_{pred}$):

$$x_{pred} = [a_{x\_p}, a_{y\_p}, a_{z\_p}, u_p, v_p, w_p, p_p, q_p, r_p, \dot{P}_{tire\_p}]^T$$

where, $a_{x\_p}$, $a_{y\_p}$, $a_{z\_p}$: predicted acceleration components;
$u_p$, $v_p$, $w_p$: predicted speed components;
$p_p$, $q_p$, $r_p$: predicted angular rate components; and
$\dot{P}_{tire\_p}$: predicted rate of change of tire pressure.

In one exemplary embodiment, the measured trajectory unit 344 receives data collected by the wireless device 200, e.g., from the wireless device data unit 320. The measured trajectory unit 344 includes a Kalman filter and/or other processing components that filters and/or otherwise derives one or more aspects of a measured or actual kinematic state of the bicycle 110 as the measured trajectory. For example, based on inputs such as acceleration data, GNSS data, magnetometer data, and/or gyroscope data, the measured trajectory unit 344 may generate current acceleration, speed, position, and angular rate of change. In some embodiments, the measured trajectory unit 344 may also calculate the steering angle and rate of change of the steering angle of the electric bicycle 110. Accordingly, one or more of these parameters may form a measured trajectory of the electric bicycle 110 (and thus, the rider) based on the data received from the wireless device 200, although in some embodiments, data from the electric bicycle 110 may also be considered to determine the measured trajectory, particularly tire pressure and steering angle, thereby resulting in "fused" data from the electric bicycle 110 and the wireless device 200. In one embodiment, the measured trajectory may be represented by the following state vector ($x_{meas}$)

$$x_{meas} = [a_{x\_m}, a_{y\_m}, a_{z\_m}, u_m, v_m, w_m, p_m, q_m, r_m, \dot{P}_{tire\_m}]^T$$

where, $a_{x\_m}$, $a_{y\_m}$, $a_{z\_m}$: measured acceleration components;
$u_m$, $v_m$, $w_m$: measured speed components;
$p_m$, $q_m$, $r_m$: measured angular rate components; and
$\dot{P}_{tire\_m}$: measured rate of change of tire pressure.

The predicted trajectory from the predicted trajectory unit 342 and the measured trajectory from the measured trajectory unit 344 are provided to the unexpected event identification unit 346. Generally, the unexpected event identification unit 346 functions to identify and/or evaluate an unexpected event based on the predicted and measured trajectories.

In one embodiment, the unexpected event identification unit 346 compares the predicted trajectory to the measured trajectory and determines if one or more trajectory values exceed a predetermined threshold. Such thresholds may be selected based on empirical data associated with unexpected conditions indicating an unexpected event, e.g. values that indicate the electric bicycle 110 has deviated from an expected trajectory. In one embodiment, the comparison and evaluation may be expressed as an unexpected event indication ($C_i$):

$$C_i = \begin{cases} 1, & \dfrac{|\tilde{x}_i|}{X_i}, i = 1 \text{ to } 10 \\ 0, & \text{Otherwise} \end{cases}$$

where,
i: index from 1 to 10;
$X_i$: the threshold value for the $i^{th}$ state $x_i$;
$\tilde{x}_i$: the difference between the predicted and measured values for the state $x_i$.

Generally, if any of the unexpected event indications (Ci) is greater than 1, the unexpected event identification unit 346 determines that an unexpected event has occurred with an event detection (ED) signal. In one exemplary embodiment, the unexpected event indications (Ci) may be summed to generate a severity level (SL) signal. Since the sum of the unexpected event indications (Ci) is the severity level (SL), a severity level (SL) signal of at least 1 will result in an event detection (ED) signal. Since a severity level (SL) signal of greater than 1 indicates that multiple unexpected event indications (Ci) have been detected, the severity level (SL) signal may provide an indication of the severity of the unexpected event. Expressions for the severity level (SL) signal and the unexpected event detection (ED) signal are reflected below:

$$SL = \sum_{i=10}^{10} C_i$$

$$ED = \begin{cases} 1, & SL \geq 1 \\ 0, & \text{Otherwise} \end{cases}$$

In some embodiments, the data from the wireless device 200 may be unavailable and/or unreliable, for example, if the wireless device 200 has been dropped. In such scenarios, the measured trajectory unit 344 may determine a measured acceleration and speed based on data from the electric bicycle 110 (e.g., from acceleration sensor 175 and wheel speed sensor 179). Further, the unexpected event identification unit 346 may compare the measured acceleration and speed to predicted acceleration and speed from the predicted trajectory unit 342 to calculate unexpected event indications (Ci), the event detection (ED) signals, and the severity level (SL) signals. As above, one or more unexpected event indications (Ci) of 1 indicate that an unexpected event has occurred.

Upon detection of an unexpected event, the unexpected event identification unit 346 sends the appropriate signal to the alert module 350. In one exemplary embodiment, the unexpected event identification unit 346 may provide the values and/or identifications of the unexpected event indications (Ci) and the values of the event detection (ED) signals and severity level (SL) signals to the alert module 350.

Upon receipt of the signals from the unexpected event identification unit 346, the alert module 350 prepares a message for the assistance center 270. The alert message may include the unexpected event indications (Ci), the event detection (ED) signals, and the severity level (SL) signals. The alert module 350 may further collect information regarding the electric bicycle 110 from other portions of the wireless device 200 and/or from the electric bicycle 110. Such information may include the time, the identification of the electric bicycle 110 and/or rider, the location of the electric bicycle 110, and/or the kinematic state (e.g., the measured trajectory and/or the difference between the measured and predicted trajectories) of the electric bicycle 110 that prompted the alert message.

In one exemplary embodiment, the alert module 350 provides the alert message to the network interface 232 with instructions to send the message to the assistance center 270. In further embodiments, the alert module 350 and/or network interface 232 may establish two-way voice and/or data communications between the wireless device 200 and the assistance center 270. For example, the assistance center 270 may verify with the rider through voice communications or data transmissions that assistance is necessary or desired, seek additional information directly from the rider, and/or to provide information to the rider regarding the proposed assistance. As a result, the unexpected event detection system 250 functions to determine the occurrence of an unexpected event with the electric bicycle, collect information regarding the unexpected event, and establish communications with the assistance center 270 to provide assistance to the rider.

Figure 3:
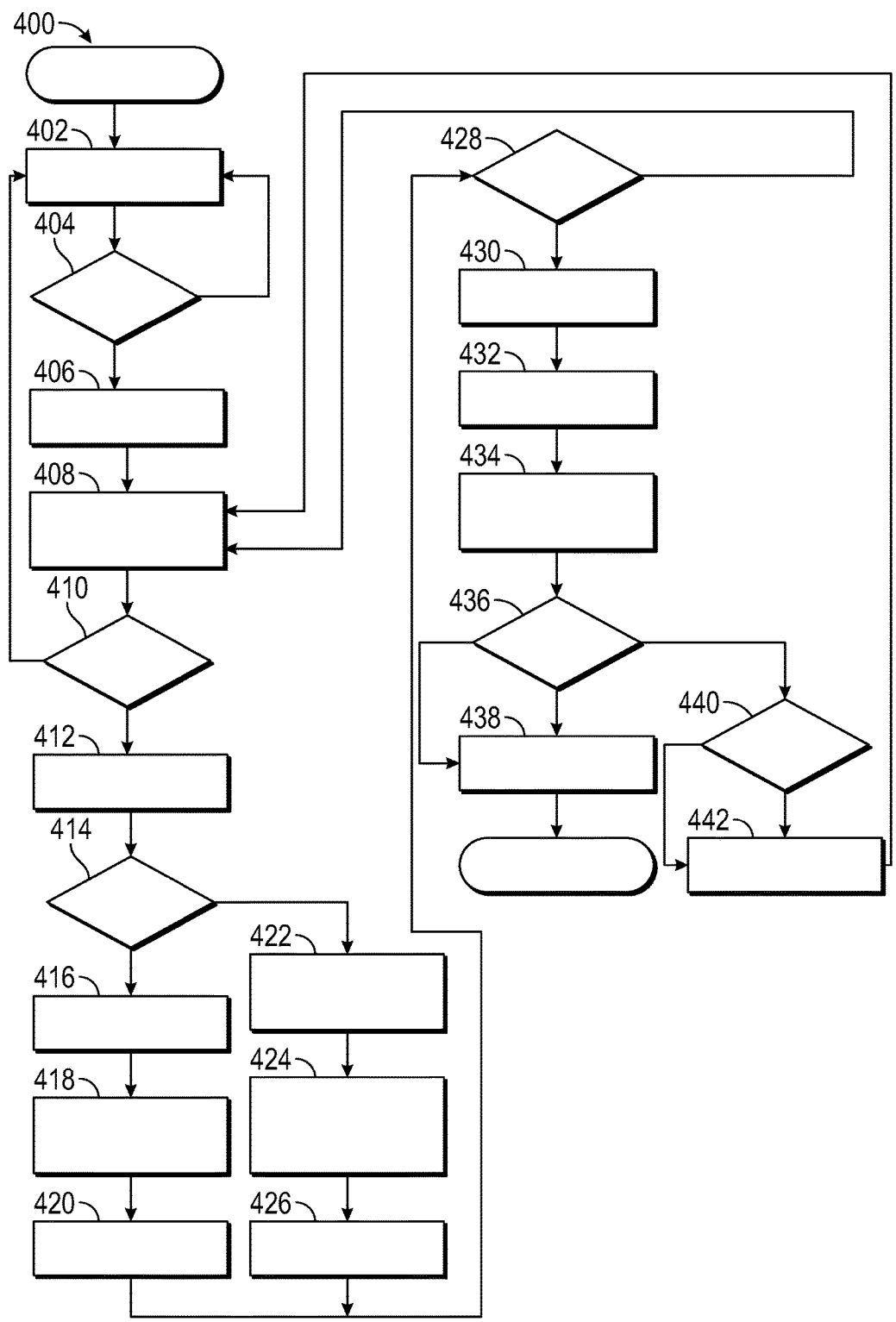
FIG. 3 is a method for detecting an unexpected event of an electric bicycle in accordance with an exemplary embodiment.

FIG. 3 is a method 400 for detecting and responding to an unexpected event on an electric bicycle in accordance with an exemplary embodiment. The method 400 of FIG. 3 may be implemented within, as an example, the environment 100 of FIG. 1 by the system 250 of FIG. 2. As such, FIGS. 1 and 2 are referenced in the discussion of the method 400 below.

The various tasks performed in connection with the method 400 may be performed by software, hardware, firmware, or any combination thereof. For illustrative purposes, the following description of the method 400 may refer to elements mentioned above in connection with FIGS. 1 and 2. It should be appreciated that the method 400 may include any number of additional or alternative tasks, the tasks shown in FIG. 3 need not be performed in the illustrated order, and the method 400 may be incorporated into a more comprehensive procedure or process having additional functionality not described in detail herein. Moreover, one or more of the tasks shown in FIG. 3 could be omitted from an embodiment of the method 400 as long as the intended overall functionality remains intact.

In a first step 402, the unexpected event detection system 250 may perform various initialization functions. The initialization functions may be performed, for example, by the state module 330 of the unexpected event detection system 250. In one exemplary embodiment, the initialization functions include confirmation that the wireless device 200 is mounted within the device mount 166 of the electric bicycle 110; confirmation that the wireless device 200 and the communications module 190 of the electric bicycle 110 have established a communications link to exchange information; confirmation of a normal tire pressure on the electric bicycle 110; confirmation that the rider is on the electric bicycle 110 (e.g., according to the tire pressure or other type of sensor); an estimation or receipt of the weight of the rider; and/or an estimation or receipt of the an inseam or height of the rider.

In step 404, the unexpected event detection system 250 determines if initialization is complete. In one exemplary embodiment, this step 404 may be performed, for example, by the state module 330 of the unexpected event detection system 250. If initialization is incomplete or otherwise unacceptable, the method 400 returns to step 402. Otherwise, the method 400 proceeds to step 406.

In step 406, the unexpected event detection system 250 estimates the combined center of gravity of the electric bicycle 110 with the rider. In one exemplary embodiment, this step 406 may be performed, for example, by the state module 330 of the unexpected event detection system 250. In some embodiments, the center of gravity may be used in the calculations of the predicted and/or measured trajectories discussed below.

In step 408, the unexpected event detection system 250 receives data from the electric bicycle 110 and/or wireless device 200. For example, the data from the electric bicycle 110 may be received by the bicycle data unit 310 and the data from the wireless device 200 may be received by the device data unit 320.

In step 410, the unexpected event detection system 250 determines if the tire pressure is normal, e.g., within a predetermined range. In one exemplary embodiment, this step 410 may be performed, for example, by the state module 330, while in further examples, the step 410 may be performed by the bicycle data unit 310 and/or the unexpected event module 340. If the tire pressure is not within a normal range, the method 400 returns to step 402. If the tire pressure is within a normal range, the method 400 proceeds to step 412.

In step 412, the unexpected event detection system 250 determines the grade on which the electric bicycle 110 is operating. The grade may be determined in any suitable manner. For example, the grade may be determined by acceleration data from the wireless device 200 within the state module 330 and/or within the unexpected event module 340.

In step 414, the unexpected event detection system 250 confirms that the wireless device 200 is still mounted within the device mount 166 on the electric bicycle 110 based on data received from the electric bicycle 110 via the bicycle data unit 310. The step 414 may be performed, for example, by the unexpected event module 340. If the wireless device 200 is mounted within the device mount 166, the method 400 proceeds to step 416. If the wireless device 200 is no longer mounted within the device mount 166, the method 400 proceeds to step 422.

In step 416, the unexpected event detection system 250 predicts the trajectory of the electric bicycle 110 primarily or completely based on the information received form the electric bicycle 110 via the bicycle data unit 310. In one exemplary embodiment, step 416 is performed by the predicted trajectory unit 342 of the unexpected event module 340 of the unexpected event detection system 250.

In step 418, the unexpected event detection system 250 measures or otherwise determines the measured or actual trajectory of the electric bicycle 110 primarily or completely based on the information received form the wireless device 200 via the device data unit 320. In some embodiments, at least some of the data considered to determine the measured trajectory may originate from the electric bicycle 110, such as the measured tire pressure. In further embodiments, corresponding types of data from the wireless device 200 and electric bicycle 110 may be fused in order to provide more accurate values. In one exemplary embodiment, step 418 is performed by the measured trajectory unit 344 of the unexpected event module 340 of the unexpected event detection system 250.

In step 420, the unexpected event detection system 250 determines the unexpected event indications (Ci), severity level (SL) signals, and event detection (ED) signals. In particular, the unexpected event detection system 250 determines the unexpected event indications (Ci), severity level (SL) signals, and event detection (ED) signals by comparing the predicted trajectory of step 416 to the measured trajectory of step 418. In one exemplary embodiment, step 420 is performed by the unexpected event identification unit 346 of the unexpected event module 340.

Returning briefly to step 414, the method 400 proceeds to step 422 when the wireless device 200 is no longer present in the device mount 166. In step 422, the unexpected event detection system 250 predicts the speed, acceleration and/or other values of the kinematic state of the electric bicycle based on bicycle data received via the bicycle data unit 310. Such data may originate, for example, from acceleration and/or wheel speed sensors 175, 179 on the electric bicycle 110 and provided to the unexpected event detection system 250 by the communications module 190 of the electronic controls 130 of the bicycle 110. In one exemplary embodiment, the speed, acceleration, and/or other values may be predicted with at least portions of the model used in step 416.

In step 424, the unexpected event detection system 250 receives and/or determines the measured speed, acceleration and/or other values of the kinematic state of the electric bicycle based on bicycle data received via the bicycle data unit 310. Such data may originate, for example, from acceleration and/or wheel speed sensors 175, 179 on the electric bicycle 110 and provided to the unexpected event detection system 250 by the communications module 190 of the electronic controls 130 of the bicycle 110. In effect, step 424 may be similar to step 418, except that the data used to determine the measured speed, acceleration, and/or or other values are based on data from the electric bicycle 110.

Upon completion of step 424, the method 400 proceeds to step 420 in which the predicted and measured kinematic states of the electric bicycle 110 are compared to generate the unexpected event indications (Ci), severity level (SL) signals, and event detection (ED) signals.

In step 428, the unexpected event detection system 250 evaluates the event detection (ED) signal. When the event detection (ED) signal is 1, the method 400 proceeds to step 428. When the event detection (ED) signal is 0, it indicates that no unexpected event has been detected, and the method 400 returns to step 408 in which data continues to be received and monitored.

In step 430, upon receipt of an event detection (ED) signal of 1, the unexpected event detection system 250 determines that an unexpected event has occurred.

In step 432, the unexpected event detection system 250 collects information associated with the unexpected event and generates an alert message. For example, the information may include the unexpected event indications (Ci), severity level (SL) signals, and event detection (ED) signals, as well as any other data collected by the bicycle data unit 310 and the wireless device data unit 320. In one exemplary embodiment, all stored information may be collected. Such information may be stored, for example, with a first-in, first-out scheme such that the stored information is the most recent and generally associated with conditions of the unexpected event. The step 432 may be performed, for example, by the alert module 350.

In step 434, the unexpected event detection system 250 initiates the sending of the alert message to the assistance center 270. In one embodiment, the alert message may be sent by the network interface 232 of the wireless device 200 via the assistance network 260.

In step 436, the wireless device 200 and/or the unexpected event detection system 250 requests confirmation from the rider that an unexpected event has occurred. In one embodiment, the confirmation request may be initiated by the assistance center 270. Such confirmation request may be in the form of a voice inquiry or a graphical user interface inquiry on the wireless device 200. If no response is received or if the response indicates that assistance is desired, the method 400 proceeds to step 438. In step 438, the assistance center 270 requests dispatch of assistance to the location of the rider. The assistance may be in form of public or private emergency responders.

If, in step 436, the rider indicates that no assistance is required, the unexpected event detection system 250 may request further information from the rider. For example, the unexpected event detection system 250 may request confirmation that an unexpected event occurred. Regardless of the rider response, the unexpected event detection system 250 may send the response and any associated information to the assistance center 270.

Accordingly, the systems and methods described above provide more effective unexpected event detection for a rider operating an electric bicycle. In particular, exemplary embodiments provide improved unexpected event identification that avoids or minimizes false positives by fusing or otherwise considering data from both the electric bicycle and a wireless device.

Generally speaking, the various functions and features described above may be carried out with any sort of hardware, software and/or firmware logic that is stored and/or executed on any platform. Some or all aspects of exemplary embodiments may be carried out, for example, using software or firmware logic that is stored in memory and executed by processor as part of application platform. The particular hardware, software and/or firmware logic may vary from context to context, implementation to implementation, and embodiment to embodiment in accordance with the various features, structures and environments set forth herein. The particular means used to implement each of the various functions may be any sort of processing structures that are capable of executing software and/or firmware logic in any format, and/or any sort of application-specific or general purpose hardware, including any sort of discrete and/or integrated circuitry.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configurable to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIGS. 1-3 depicts exemplary arrangements of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An unexpected event detection system for a rider operating an electric bicycle, comprising:
    a bicycle data unit configured to receive bicycle data from the electric bicycle;
    a wireless device data unit configured to receive device data from a wireless device;
    an unexpected event module coupled to receive the bicycle data from the bicycle data unit and to receive the device data from the wireless device, the unexpected event module configured to identify an unexpected event associated with the electric bicycle based on the bicycle data and the device data and to generate an alert message upon identification of the unexpected event,
    wherein the unexpected event module is configured to determine a predicted trajectory of the electric bicycle based at least on the bicycle data, determine a measured trajectory of the electric bicycle based at least on the device data, and identify the unexpected event based on a comparison of the predicted trajectory and the measured trajectory; and
    an alert module coupled to the unexpected event module and configured to initiate sending the alert message to an assistance center.

2. The unexpected event detection system of claim 1, wherein the alert module is configured to initiate the sending of the alert message to the assistance center via the wireless device.

3. The unexpected event detection system of claim 1, wherein the unexpected event module is further configured to determine the measured trajectory of the electric bicycle based at least on the bicycle data.

4. The unexpected event detection system of claim 1, wherein the bicycle data unit, the wireless device data unit, the unexpected event module, and the alert module are implemented on the wireless device.

5. The unexpected event detection system of claim 1, further comprising a state module coupled to the unexpected event module and configured to initialize a monitoring for the unexpected event associated with the electric bicycle based on at least a status the wireless device relative to a device mount on the electric bicycle.

6. The unexpected event detection system of claim 5, wherein the state module is further configured to initialize the monitoring based on a status of a communications connection between the wireless device and the electric bicycle.

7. A wireless device for detecting an unexpected event for a rider on an electric bicycle, comprising:
a bicycle interface configured to receive bicycle data from the electric bicycle;
an acceleration sensor configured to determine an acceleration of the wireless device;
a controller coupled to the bicycle interface and the acceleration sensor, the controller having a processor and non-transitory memory storing computer readable instructions capable of, upon execution by the processor, forming an unexpected event detection system comprising:
a bicycle data unit configured to receive the bicycle data from the electric bicycle via the bicycle interface;
a wireless device data unit configured to receive the acceleration from the acceleration sensor as device data;
an unexpected event module coupled to receive the bicycle data and the device data, the unexpected event module configured to identify the unexpected event associated with the electric bicycle based on the bicycle data and the device data and to generate an alert message upon identification of the unexpected event,
wherein the unexpected event module is configured to determine a predicted trajectory of the electric bicycle based at least on the bicycle data, determine a measured trajectory of the electric bicycle based at least on the device data, and identify the unexpected event based on a comparison of the predicted trajectory and the measured trajectory; and
an alert module coupled to the unexpected event module and configured to initiate sending the alert message to an assistance center; and
a network interface coupled to the controller and configured to send the alert message to the assistance center via a cellular network.

8. The wireless device of claim 7, further comprising a GNSS sensor coupled to the controller and configured to determine a location of the wireless device, the alert message including the location of the wireless device.

9. The wireless device of claim 7, wherein the unexpected event detection module further comprises a state module coupled to the unexpected event module and configured to initialize a monitoring for the unexpected event associated with the electric bicycle based on at least a status the wireless device relative to a device mount on the electric bicycle.

10. The wireless device of claim 7, further comprising a bicycle interface configured to form a wireless connection between the wireless device and the electric bicycle to receive the bicycle data.

11. A computer implemented method for detecting an unexpected event for a rider on an electric bicycle, the method comprising:
receiving bicycle data from the electric bicycle;
receiving wireless device data from a wireless device;
identifying the unexpected event associated with the electric bicycle based on the bicycle data and the device data,
wherein the identifying step includes determining a predicted trajectory of the electric bicycle based at least on the bicycle data, determining a measured trajectory of the electric bicycle based at least on the device data, and determining the unexpected event based on a comparison of the predicted trajectory and the measured trajectory; and
sending an alert message upon identification of the unexpected event to an assistance center.

12. The method of claim 11, wherein the sending step includes sending the alert message through a cellular network.

13. The method of claim 11, wherein the receiving the bicycle data includes receiving first acceleration data from the electric bicycle, and wherein the determining the predicted trajectory includes determining the predicted trajectory based on at least the first acceleration data as the bicycle data.

14. The method of claim 13, wherein the receiving the wireless device data includes receiving second acceleration data from the wireless device, and wherein the determining the measured trajectory includes determining the measured trajectory based on at least the second acceleration data as the wireless device data.

15. The method of claim 14, wherein the receiving the wireless device data includes receiving location data from an GNSS sensor on the wireless device, and wherein the determining the measured trajectory includes determining the measured trajectory based on at least the location data as the wireless device data.

16. The method of claim 11, wherein the method is implemented on the wireless device, and wherein the method further comprises establishing a short range communications connection between the wireless device and the electric bicycle.

17. The method of claim 11, further comprising determining a status of the wireless device relative to a device mount on the electric bicycle and initializing a monitoring for the unexpected event associated with the electric bicycle based on at least the status.

* * * * *